(12) United States Patent
Bokhour (10) Patent No.: US 6,614,721 B2
(45) Date of Patent: Sep. 2, 2003

(54) COLLISION AVOIDANCE METHOD AND SYSTEM

(76) Inventor: Edward Bokhour, 67 Crest St., Concord, MA (US) 01742

( * ) Notice: Subject to any disclaimer, the term of this patent is extended or adjusted under 35 U.S.C. 154(b) by 0 days.

(21) Appl. No.: 09/977,858

(22) Filed: Oct. 15, 2001

(65) Prior Publication Data

US 2002/0067660 A1 Jun. 6, 2002

Related U.S. Application Data

(60) Provisional application No. 60/240,164, filed on Oct. 13, 2000.

(51) Int. Cl.$^7$ ................................................. G01S 3/80
(52) U.S. Cl. ....................... 367/128; 367/127; 367/907; 340/825.49; 340/825.72
(58) Field of Search ................................. 367/127, 128, 367/907, 909; 340/10.1, 572.1, 573.1, 825.49, 825.72, 539

(56) References Cited

U.S. PATENT DOCUMENTS

| | | | | |
|---|---|---|---|---|
| 4,751,689 A | * | 6/1988 | Kobayashi | 367/128 |
| 4,813,025 A | * | 3/1989 | Rowland et al. | 367/128 |
| 5,198,800 A | | 3/1993 | Tozawa et al. | 340/573 |
| 5,491,670 A | * | 2/1996 | Weber | 367/128 |
| 5,528,232 A | * | 6/1996 | Verma et al. | 340/825.54 |
| 5,708,421 A | * | 1/1998 | Boyd | 340/573 |
| 5,940,006 A | | 8/1999 | MacLellan et al. | 340/825.54 |
| 6,327,219 B1 | * | 12/2001 | Zhang et al. | 367/128 |

OTHER PUBLICATIONS

International Search Report for corresponding International Application No. PCT/US01/32109.

* cited by examiner

*Primary Examiner*—Ian J. Lobo
(74) *Attorney, Agent, or Firm*—McDermott, Will & Emery (57) ABSTRACT

A presence detection system includes a reader device attached to a first body, and a tag device attached to a second body. The reader device has an ultrasonic transducer for generating and transmitting ultrasonic pulses at a first rate of occurrence; an RF receiver for receiving a RF signal; and a microcontroller coupled to the ultrasonic transducer and the RF receiver for receiving signals from the ultrasonic transducer and the RF receiver and for controlling the operation of ultrasonic transducer and the RF receiver. The tag device has an ultrasonic receiver for receiving ultrasonic pulses from the ultrasonic transducer of the reader device; and an RF pulse generator for generating and transmitting an RF pulse. The microcontroller instructs the ultrasonic transducer to generate and transmit the ultrasonic pulses; the ultrasonic receiver of the tag device receives at least one of the ultrasonic pulses; the ultrasonic receiver triggers the RF signal generator to transmit an RF pulse; the RF receiver of the reader device receives the RF signal; and the microcontroller detects the presence of the tag device based on the reception of the RF pulse. The distance between the reader device and the tag device is determined based on the amount of time between the transmission of the ultrasound pulse by the reader device and the reception of the response RF pulse by the reader device.

18 Claims, 6 Drawing Sheets

COLLISION AVOIDANCE METHOD AND SYSTEM

CROSS-REFERENCE TO RELATED APPLICATIONS

This application claims the benefit of U.S. Provisional Application Serial No. 60/240,164, filed Oct. 13, 2000, entitled COLLISION AVOIDANCE SYSTEM.

FIELD OF THE INVENTION

The present invention relates generally to a collision avoidance method and system and more particularly to a method of and system for detecting the presence of an object within a range of a reference point and for determining the distance between the object and the reference point and, if the object is within a predetermined distance from the reference point, activating an alarm.

BACKGROUND OF THE INVENTION

A typical construction or mining area can include heavy machinery, such as bulldozers, front loaders, cranes, surface and subsurface mining equipment and other construction vehicles, as well as construction workers working in the area on foot. Such an environment, where the equipment, as well as the work being done, is very loud, can be extremely dangerous for those construction workers which are working on foot in close proximity with the construction vehicles. In fact, in 1996, 461 non-occupant fatalities were reportedly caused by heavy and medium sized construction vehicles. In the subsurface mining industry alone, there are an average of five collision deaths a year, and many more injuries due to collisions between construction vehicles and construction pedestrians. This is mainly because of the type of working environment, which can have varying terrain which can hamper a construction vehicle operator's view of the surrounding area, and the design of the construction vehicles, which is not necessarily geared toward providing the operator with an optimal view of his or her surroundings.

Prior art attempts at preventing construction site collisions include equipping construction vehicles with beepers which are activated when the vehicle is shifted into reverse to warn pedestrians of the vehicle's movement. While this type of warning system can be helpful, it does not alarm the driver of the vehicle of the presence of pedestrians and, in a construction environment where very loud vehicles are being operated and loud work such as blasting, digging, etc. is being performed, it is possible that a pedestrian in potential danger may not hear the beeper.

Other attempts at providing safety for construction pedestrians include electromagnetic signal-based systems (i.e. RF, infrared, optical) in which an alarm is placed proximate the operator of the vehicle and a detection device is mounted external to the vehicle, typically at the rear of the vehicle. In one type of system, the pedestrian wears a passive receiver device for receiving an interrogation signal output by the detection device and which transmits a response signal to the detection device upon receiving the interrogation signal. While such systems may be more effective than the beeper-type systems, passive RF receivers require large electric field strengths to be output by the detection device. This type of system can be very dangerous if used in the presence of explosives. Infrared systems are hampered by high levels of background noise (heat sources) which makes them unsuitable for many applications in the construction and mining trades as well as in fire and rescue situations. Optical systems are limited strictly to line-of-sight detection, which limits their use in a similar fashion. Furthermore, none of these systems are easily made to determine range at reasonably close distances due to the extremely short time of flight of the signals.

Alternatively, the device worn by the pedestrian may be an active transmitter device which periodically transmits a signal to a receiver mounted on the vehicle. Upon receiving the signal from the pedestrian, the receiver may sound an alarm to notify the operator of the presence of the pedestrian. While RF versions of this type of system do not require the large electric field strengths required by the passive system, in general these systems suffer from the same problems as the passive tag types, are not able to determine the distance of the pedestrian from the receiver, and are thus more likely to cause false alarms. Typically, they infer proximity between the receiver and transmitting device through measurement and/or signal processing of the received signal intensity, which does not allow distance measurement to a level of accuracy sufficient to insure safety.

SUMMARY OF THE INVENTION

The present invention is directed to a collision avoidance system including a reader device attached to a moving vehicle such as a construction vehicle and a tag device, which is worn on the body of a construction pedestrian. The reader device periodically transmits an ultrasonic pulse which, if the pedestrian is within a predetermined range, is received by the tag device. The tag device, in response to the reception of the ultrasonic pulse from the reader device, transmits an RF response pulse to the reader device. The reader device determines the distance of the pedestrian from the reader device based on the elapsed time between the transmission of the ultrasonic pulse and the reception of the RF pulse. Varying modes of alarm may be activated, based on the distance of the pedestrian from the reader device. A visual and/or audible alarm device is located proximate the operator of the vehicle. It should be noted that for the purposes of this writing, it is assumed that the tag device is worn by a pedestrian and the reader device is mounted on a moving vehicle. However, a tag and reader pair may be installed on any number of objects, of any type, which one wishes to protect from collisions. Furthermore, any number of tags may be installed on multiple objects within the fields of any number of readers, to support collision avoidance between those objects with readers and those objects with tags. It is further noted that the present invention describes ultrasonic transmissions in air, as it is expected this will be appropriate for the largest number of applications. However, operation of the system in other transmission media, such as through smoke, debris, or underground, is possible with straightforward changes to account for ultrasonic transducer interfacing to the medium and to account for the speed of sound in the medium.

According to one embodiment of the invention, a presence detection system is disclosed, including a reader device attached to a first body, and a tag device attached to a second body. The reader device has an ultrasonic transducer for generating and transmitting ultrasonic pulses at a first rate of occurrence; an RF receiver for receiving an RF signal; and a microcontroller coupled to the ultrasonic transducer and the RF receiver for receiving signals from the RF receiver and for controlling the operation of the ultrasonic transducer and the RF receiver. The tag device has an ultrasonic receiver for receiving ultrasonic pulses from the ultrasonic transducer of the reader device; and an RF pulse generator for generating and transmitting an RF pulse. The microcontroller in the reader device instructs the ultrasonic transducer to generate and transmit the ultrasonic pulses; the ultrasonic receiver of the tag device receives at least one of the ultrasonic pulses; the ultrasonic receiver in the tag device triggers the RF signal generator to transmit an RF pulse; the RF receiver of the reader device receives the RF signal; and the microcontroller detects the presence of the tag device based on the reception of the RF pulse.

The tag device may further include a timing circuit, which may be a second microcontroller, which operates to trigger the RF pulse generator of the tag device to transmit an RF pulse at a second rate of occurrence, the second rate of occurrence being different from the first rate of occurrence. One of the ultrasonic pulses transmitted by the ultrasonic transducer may be transmitted at a time $\tau_1$, and the RF pulse resulting from the reception of the ultrasonic pulse by the ultrasonic receiver in the tag device may be received by the RF receiver of the reader device at a time $\tau_2$; wherein the microcontroller determines a distance D between the reader device and the tag device according to the equation:

$$D=V_S(\tau_2-\tau_1);$$

where $V_S$ is the velocity of sound in air. The timing circuit, or second microcontroller, may generate a timing pulse to trigger the RF transmitter to transmit an RF pulse at the second rate of occurrence when the ultrasonic receiver does not receive an ultrasonic pulse from the ultrasonic transducer within a predetermined period of time from the reception of a previous ultrasonic pulse. As an example, the first rate of occurrence may be three pulses per second and the second rate of occurrence may be one pulse per second. The first body may be a movable vehicle having the reader device attached thereto and the second body may be a person having the tag device attached thereto. The system may further include an alarm device coupled to the first microcontroller, wherein the first microcontroller activates the alarm device upon detecting the presence of the tag device, or when the tag device is determined to be within a predetermined range. The alarms may vary in type depending on the how range, rate of range closure, or simple presence detection are prioritized for a given application. The visual indicator may include a plurality of LEDs in which the number of LEDs that are triggered increases as the distance between the reader device and the tag device decreases. The audible indicator may include a beeper in which the frequency of beeps output by the beeper increases as the distance between the reader device and the tag device decreases. The timing circuit may include a microcontroller which is programmed trigger the RF pulse generator at predetermined intervals and when the ultrasonic pulse is received by the ultrasonic receiver.

According to another embodiment of the invention, a system for determining the distance between a first object and a second object is disclosed including:

a reader device mounted on the first body, the reader device including an ultrasonic transducer, a microcontroller and an RF receiver; and a tag device mounted on the second object, the tag device including an ultrasonic receiver and an RF pulse transmitter;

wherein, in response to receiving an ultrasonic pulse transmitted by the reader device at a time $T_A$, the tag device transmits an RF pulse, which is received by the reader device at a time $T_B$, and the microcontroller of the reader device determines the distance D between the first and second objects according to the equation:

$$D=V_S \cdot (T_B-T_A);$$

where $V_S$ is the velocity of sound in air.

According to another embodiment of the invention, a method of detecting the presence of an object is disclosed including:

A. transmitting ultrasonic pulses at a first rate of occurrence from a first location;

B. receiving at least one of the ultrasonic pulses at a second location;

C. transmitting an RF pulse in response to the reception of the ultrasonic pulse at the second location;

D. receiving the RF pulse at the first location; and

E. detecting the presence of the object at the second location based on the reception of the RF pulse at the first location.

The method may further include determining a distance of the object from the first location based on an elapsed time between the transmission of the ultrasonic pulse from the first location to the reception of the RF pulse at the first location. The method may further include activating an alarm when the distance between the object and the first location is less than a predetermined range. The activating step may include at least one of illuminating a series of LEDs and activating a beeper.

According to yet another embodiment of the invention, a method for determining a distance between a first object location and a second object location is disclosed, including:

A. transmitting an ultrasonic pulse from the location of the first object at a time $T_A$;

B. receiving the ultrasonic pulse at the location of the second object;

C. transmitting an RF pulse from the second object location in response to the reception of the ultrasonic pulse;

D. receiving the RF pulse at the first object location at a time $T_B$; and

E. determining the distance D between the first object location and the second object location according to the equation:

$$D=V_S \cdot (T_B-T_A);$$

where $V_S$ is the velocity of sound in air.

BRIEF DESCRIPTION OF THE DRAWINGS

The foregoing and other objects of this invention, the various features thereof, as well as the invention itself may be more fully understood from the following description when read together with the accompanying drawings in which.

DETAILED DESCRIPTION

Figure 1:
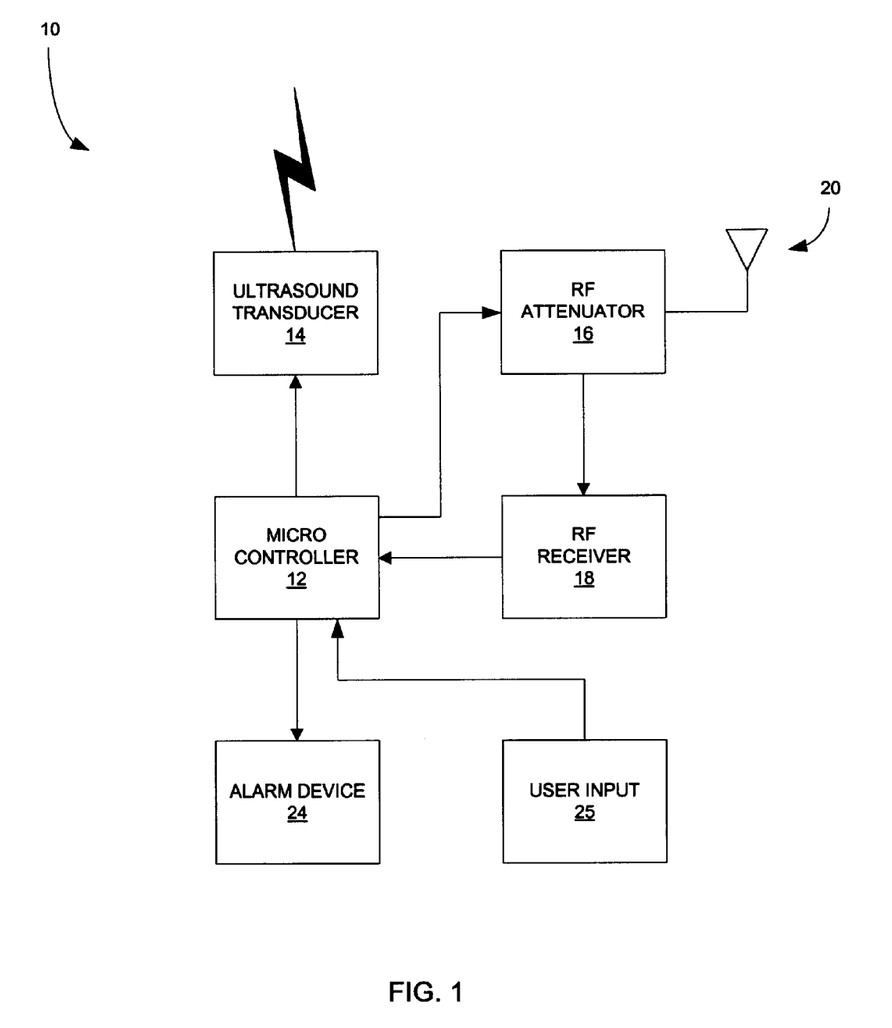
FIG. 1 is a schematic block diagram of a reader device in accordance with the present invention.
Figure 2:
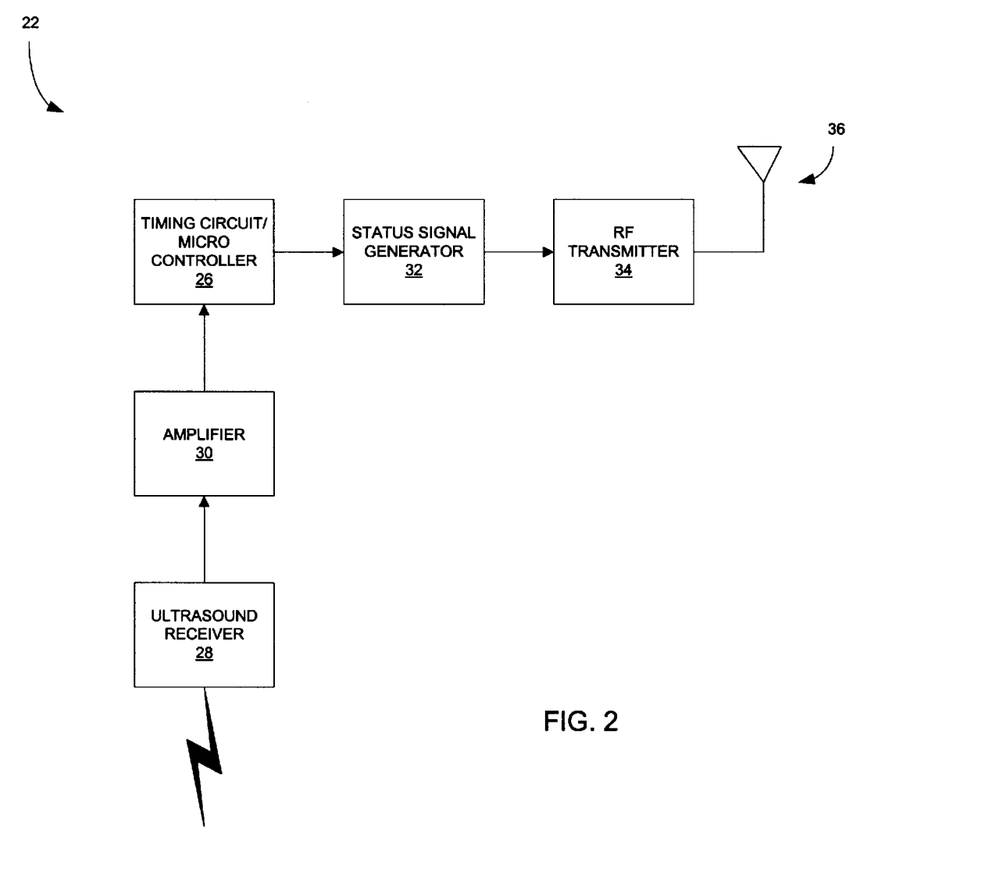
FIG. 2 is a schematic block diagram of a tag device in accordance with the present invention.

The present invention is described below in which the reader device 10, FIG. 1 is attached to a vehicle, such as a tractor, bulldozer, etc. and the tag device, 22, FIG. 2, is attached to or worn by a construction pedestrian. It will be understood however, that the invention is not limited to application in a construction environment and that any fixed or movable object may have the reader device attached thereto and any fixed or movable object may have the tag device attached thereto.

Reader device 10 includes a microcontroller 12 which controls the operation of an ultrasonic air transducer 14, an RF attenuator 16, an RF receiver 18, an antenna 20, an alarm device 24 and a user input device 25. In one embodiment, microcontroller 12 is a BS2-IC microcontroller from Parallax, Inc. It is programmed to control ultrasonic air transducer 14, which is preferably a directional, long-range transducer, such as the 30 kHz and 41 kHz air transducers available from Airmar Technology Corp. of Milford, N.H., which have a range of approximately 30 meters. The directional beam from the transducer 14 can be spread using a reflector (not shown), such as a partial sphere, to facilitate more uniform coverage of the detection area near the vehicle to which the reader device 10 is attached. Although the use of a reflector will cause a loss of overall range of the transducer 14, the transducer will still have a range of at least 15 meters which is suitable for the purpose of the invention in connection with construction vehicles. It will be understood that transducers having greater ranges will be required when used in connection with vehicles that are travelling at a higher rate of speed than construction vehicles.

Reader device 10 also includes a digitally-controlled RF attenuator 16, such as the Mini-Circuits TOAT-3610 attenuator. RF attenuator 16 is coupled to a ¼ wave whip antenna 20. RF attenuator is also coupled to the input of RF receiver 18, such as a RXM-315-LC RF receiver module from Linx Technologies, and operates to reduce the level of incoming RF signal presented to the input of receiver 18, under TTL control, to provide step control of the range within which a tag device 22 can be detected. An alarm device 24 is coupled to microcontroller 12 for alerting the operator of the vehicle to which the reader device 10 is attached of the presence of a pedestrian within the warning range of the reader. As is described in greater detail below, alarm device 24 preferably includes both audio and visual alert mechanisms. User input device 25 is used by the operator to program various settings of the reader device 10, such as the sensitivity or range of detection and the various alarm modes.

Although all of the components of reader device 10 may be enclosed within a single enclosure which is mounted on the vehicle proximate the area to be monitored, it is preferable to mount the alarm device 24 proximate the operator of the vehicle and the remaining components and antenna in a single weatherproof enclosure proximate the area to be monitored. Power for the reader device may be obtained through the vehicle's battery system.

As shown in FIG. 2, tag device 22 also includes a timing circuit or microcontroller 26 which controls the operation of the tag device 22. Tag device also includes an ultrasonic receiver 28, an amplifier 30, a status signal generator 32, an RF transmission device 34 and an antenna 36. All of the components of the tag device 22, including a battery power source (not shown) are enclosed in a weather-tight enclosure which can be worn on the body by means of a clip or by affixing the tag device to a hard hat, for example.

Ultrasonic receiver 28 is preferably a closed-face piezoelectric air transducer designed to resonate at a particular frequency, such as 40 kHz. The transmission device 34 is a low cost "digital in, RF out" device, such as the TXM-315-LC RF transmitter module from Linx Technologies. This transmitter employs pulse carrier modulation to generate a 315 MHz carrier signal when a logic high is input thereto and which turns off when a logic low is input thereto. Accordingly, the RF signal transmitted by the tag device 22 is a 315 MHz carrier whose amplitude is modulated in a binary fashion.

Figure 3:
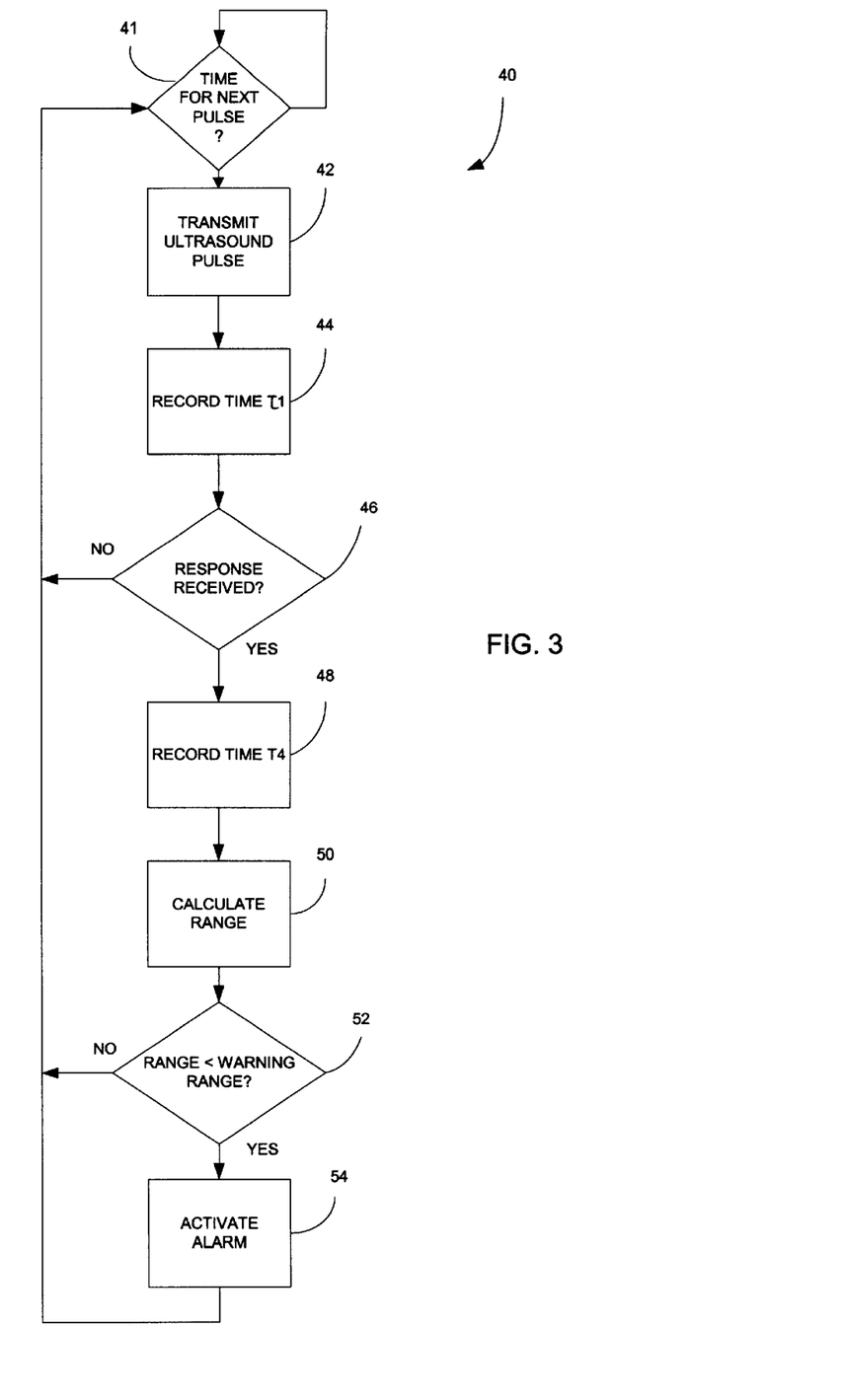
FIG. 3 is a flow diagram of the operation of the reader device of FIG. 1 in accordance with the present invention.
Figure 4:
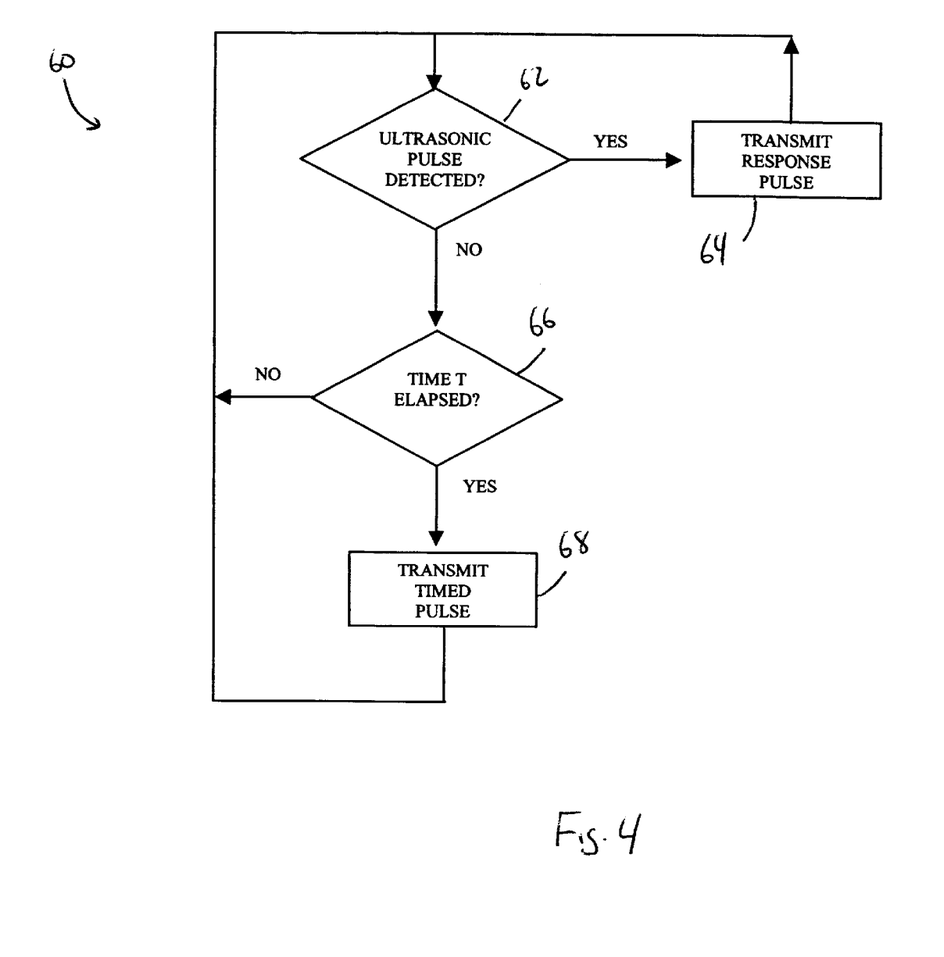
FIG. 4 is a flow diagram of the operation of the tag device of FIG. 2 in accordance with the present invention.
Figure 5:
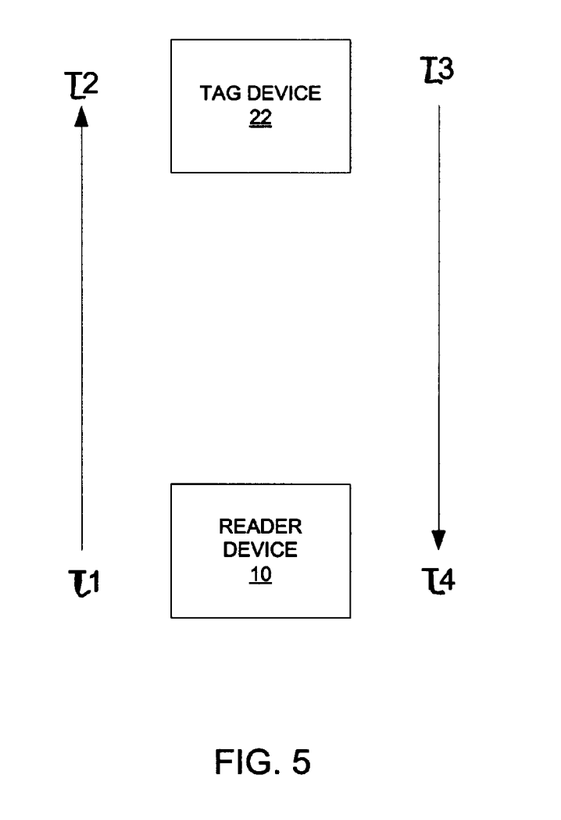
FIG. 5 is a schematic block diagram showing the transmission and reception times according to the present invention.

The operation of the reader device 10 and the tag device 22 will now be described with reference to FIGS. 3, 4 and 5. FIG. 3 is a flow diagram 40 of the operation of the reader device 10; FIG. 4 is a flow diagram 60 of the operation of the tag device 22 and FIG. 5 is a simple block diagram showing the transmission/reception timing between the reader device 10 and the tag device 22. In step 41, the microcontroller 12 determines whether the time between consecutive pulses has expired such that a next pulse will be transmitted. In step 42, the ultrasonic transducer 14 of reader device 10 transmits an ultrasonic pulse at a time $\tau_1$. This time $\tau_1$ is recorded in memory in microcontroller 12 which then waits for a response from the tag device 22, step 46. The microcontroller 12 is programmed such that it instructs the ultrasonic transmitter 14 to transmit a pulse at predetermined time intervals. In the preferred embodiment, the ultrasonic transmitter 14 transmits an ultrasonic pulse three times per second. Accordingly, the microcontroller 26 of tag device 22 is programmed to wait for a period of time T within which it expects to receive an ultrasonic pulse from the reader device 10, step 66. In the preferred embodiment of the invention, the time T is set to 1 second, although any reasonable time may be set. In the case of the tag device having a timing circuit, the timing circuit outputs a signal to activate the status signal generator 32 at every time T, 1 second in this example. Accordingly, regardless of whether an ultrasonic pulse is received by the receiver 28, the timing generator outputs an activation signal to the status signal generator 32 once per second. If an ultrasonic pulse is received by the receiver 26, amplifier 30 inputs the received signal to the timing generator, whose timing is overridden, and an activation signal is output to the status signal generator 32.

Figure 6:
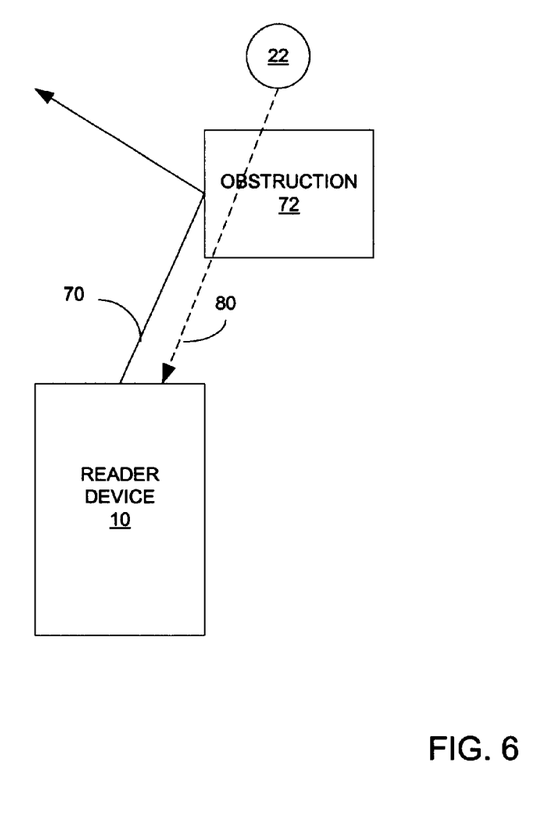
FIG. 6 is a schematic diagram of a reader device and a tag device of the present invention, with an obstruction therebetween.

In the case of the microcontroller, if an ultrasonic pulse from the reader device 10 is not received, step 62, within the time T, step 66, microcontroller 26 activates status signal generator 32, which inputs a logic high to RF transmitter 34, causing it to transmit an RF pulse through antenna 36, step 68, at a repetition rate of once per second. Whenever an ultrasonic pulse is detected by the receiver 28, step 62, a response RF pulse is transmitted, step 64. This RF pulse train is received by the RF receiver 18 through antenna 20 and RF attenuator 16 of reader device 10 and informs the reader device that the tag device is within RF range, but is not receiving the ultrasound pulse transmitted by the reader device 10. In this case, the alarm device 24 of the reader device 10 will indicate to the operator that a tag has been detected within the range of the reader device, but that it is either beyond the range of the ultrasound transmission, or that there is an obstruction between the reader device 10 and the tag device 22 which is preventing the tag device from receiving the ultrasound pulse. The alarm would therefore warn the operator of the presence of a tag, but would not necessarily require the operator to stop the vehicle. Such a scenario is depicted in FIG. 6, which schematically shows a reader device 10 transmitting an ultrasound pulse, indicated by line 70. Since an obstruction 72 is located between the tag device 22 and the reader device 10, the ultrasound pulse is reflected away from tag device 22. After the predetermined time period T, 1 second in this example, if the tag device has not received an ultrasound pulse, step 64, the timing circuit or microcontroller 26 instructs status signal generator 32 to activate the RF transmitter 34 to transmit an RF pulse 80 to the reader device 10, step 68 at a repetition rate of once per second. The tag device then continues to monitor the amount of time between the reception of ultrasound pulses, step 62.

If the ultrasound receiver 28 of tag device 22 receives an ultrasound pulse within the time period T, at time 2, FIG. 5, the timing circuit or microcontroller 26 commands the status signal generator 32 to generate an RF response pulse. Status signal generator 32 then activates the RF transmitter 34 to transmit, at time $\tau_3$, a response RF pulse to the reader device 10, step 66. The tag device then continues to monitor the amount of time between the reception of ultrasound pulses, step 62.

The reader device, in step 46, FIG. 3, waits for a response RF pulse from tag device 22. When a response RF pulse is received, at time $\tau_4$, microcontroller 12 records this time, step 48, and determines the distance of the tag device 22 from the reader device 10, step 50. Since, in the close-range environment in which the invention is used, the transmission time of the RF pulse from the tag device to the reader device is negligible, typically on the order of tens of nanoseconds, microcontroller 12 determines the distance between the reader device 10 and the tag device 22 using the following equation:

$$D = V_S \cdot (\tau_4 - \tau_1);$$

where $V_S$ is the velocity of sound in air. Errors introduced by the use of $\tau_4$ rather than $\tau_2$ will be small, but fixed. Thus, if increased range accuracy is desired, the known additional time delays of $\tau_3 - \tau_2$ (propagation time of the signal through the tag electronics) and $\tau - \tau_3$ (time of flight of the RF pulse) can be calculated and used to correct the distance calculation. Since the velocity determined using the above equation is a function of the air temperature, reader device 12 includes a temperature monitor (not shown) and microcontroller 12 is programmed with, for example, a temperature correction look-up table, to take the air temperature into account when determining the distance between the tag device 22 and the reader device 10, as described above.

If the tag device 22 is determined to be within a predetermined warning range, step 52, microcontroller 12 activates the alarm device 24, thereby warning the operator of the vehicle that a pedestrian is within the warning range. Based on the distance measurement, the microcontroller 12 can instruct the alarm device 24 to provide varying types of alarms. For example, a graduated LED display could indicate the distance of the tag device from the reader device based on the number of LED activated, i.e., the closer the tag device is, the more LEDs will be lit. Furthermore, yellow LEDs could be used to indicate that the tag device is just within the perimeter of the warning range of the reader device 10, and red LEDs could be used to indicate a smaller distance between the tag device and the reader device. In the case of multiple tags within the readers field, the LED would indicate the range of the closest tag. An audible alarm mode would also be activated to warn the operator in a similar manner, i.e., a frequency of beeps output by the alarm could indicate the proximity of the tag device, wherein faster beeps correspond to smaller distances between the tag device 22 and the reader device 10.

Warnings can also be based on the rate of change of a pedestrian's distance from the reader device, based on a series of consecutive measurements, such that no warning is sounded if, for example, the distance between the tag device and the reader device remains constant, even if the tag device is within the warning range. This would allow the vehicle operator to be wearing a functional tag which is detected by the reader, but would not generate a false alarm. Furthermore, the visual or audible frequency of the alarm can be made proportional to the rate at which the distance between the reader device and the tag device is changing, such that a faster rate of change will result in faster flashing of the LEDs or faster beeping of the audible alarm.

If, in step 52, microcontroller 12 determines that the tag device is not within the warning range, the alarm is not activated and the reader device continues to transmit ultrasound pulses at the predetermined rate and waits for response RF pulses.

Since there is no need for the reader device 10 to identify the tag devices 22 with which it interacts, the reader device 10 of the present invention is capable of operating in the presence of a large number of tag devices 22 and in the presence of other reader devices. This might raise the concern that due to a large number of tags producing RF pulses near a given reader that RF pulses could be received at times which produce false alarms. However, the microcontroller 12 can be easily programmed to ignore spurious RF pulses it may receive from tags which are either not within the range of interest (warning range), or which arrive at a time which may make them appear to be a valid (in-range) response to the ultrasonic pulse of the reader device even if they are not. For example, in the case where there are no tags within the predetermined warning range of the reader, and the reader device transmits an ultrasonic pulse, and happens to receive an RF pulse at just the right time, generated either by a tag within RF range or an unknown source of RF noise at the RF receiver frequency, the microcontroller might determine such a received RF pulse indicates a tag within warning range. However, if the microcontroller 12 is programmed to warn or sound an alarm only when a number of successive RF pulses (three, for example) are received by the reader device at the first rate of occurrence, then false alarms of this type will be avoided.

Accordingly, the present invention provides a collision avoidance method and system including a reader device which is mounted on a vehicle and a tag device which is attached to a moving or stationary object or person. The reader device transmits an ultrasonic pulse which, when received by a tag device, causes the tag device to transmit a response RF pulse to the reader device. Based on the amount of time between the transmission of the ultrasound pulse and the reception of the RF pulse, the reader device is able to calculate the distance between the reader device and the tag device. If the distance is within a predetermined range, the reader device activates an alarm to warn the operator of the vehicle of the presence of the pedestrian. If the tag device does not receive an ultrasound pulse from the reader device within a predetermined period of time, it transmits an RF pulse to the reader device, which operates to inform the reader device that the tag device is either out of ultrasonic range or that there is an obstruction between the reader device and the tag device. The dual-mode transmission of the present invention (ultrasound and RF) is advantageous because the ultrasound transmission enables the reader device to calculate the distance between the reader device and the tag device and the RF transmission enables the tag device to communicate with the reader device even if there is an obstruction between the two devices. The simple construction of the elements of the invention results in an inexpensive and low-maintenance collision avoidance system.

The invention may be embodied in other specific forms without departing from the spirit or essential characteristics thereof. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

What is claimed is:

1. A presence detection system comprising:
    a reader device attached to a first body, comprising:
        an ultrasonic transducer for generating and transmitting ultrasonic pulses at a first rate of occurrence;
        an RF receiver for receiving an RF signal; and
        a first microcontroller coupled to said ultrasonic transducer and said RF receiver for receiving signals from said RF receiver and for controlling the operation of ultrasonic transducer and said RF receiver; and
    a tag device attached to a second body, comprising:
        an ultrasonic receiver for receiving ultrasonic pulses from said ultrasonic transducer of said reader device;
        an RF pulse generator for generating and transmitting an RF pulse; and
        a timing circuit which operates to trigger said RF pulse generator to transmit an RF pulse at a second rate of occurrence, said second rate of occurrence being different from said first rate of occurrence;
    wherein:
        A. said first microcontroller instructs said ultrasonic transducer to generate and transmit said ultrasonic pulses:
        B. said ultrasonic receiver of said tag device receives at least one of said ultrasonic pulses;
        C. said ultrasonic receiver triggers said RF signal generator to transmit an RF pulse;
        D. said RF receiver of said reader device receives said RF signal;
        E. said first microcontroller detects the presence of said tag device based on the reception of said RF pulse; and
        F. said timing circuit generates a timing pulse to trigger said RF transmitter to transmit an RF pulse at said second rate of occurrence when said ultrasonic receiver does not receive an ultrasonic pulse from said ultrasonic transducer within a predetermined period of time from the reception of a previous ultrasonic pulse.

2. The system of claim 1 wherein one of said ultrasonic pulses transmitted by said ultrasonic transducer is transmitted at a time $\tau_1$, and said RF pulse resulting from the reception of said ultrasonic pulse by said ultrasonic receiver is received by said RF receiver of said reader device at a time $\tau_2$;
    wherein said first microcontroller determines a distance D between said reader device and said tag device according to the equation:

$$D=V_S(\tau_2-\tau_1);$$

where $V_S$ is the velocity of sound in air.

3. The system of claim 1 wherein said first rate of occurrence is three pulses per second.

4. The system of claim 3 wherein said second rate of occurrence is one pulse per second.

5. The system of claim 4 wherein said first body is a movable vehicle having said reader device attached thereto.

6. The system of claim 5 wherein said second body is a person having said tag device attached thereto.

7. The system of claim 1 further comprising an alarm device coupled to said first microcontroller, wherein said first microcontroller activates said alarm device upon detecting the presence of said tag device.

8. The system of claim 2 further comprising an alarm device coupled to said first microcontroller, wherein said first microcontroller activates said alarm device upon detecting the presence of said tag device.

9. The system of claim 8 wherein said alarm device includes at least one of a visual indicator of the activation of said alarm and an audible indicator of the activation of said alarm.

10. The system of claim 9 wherein said visual indicator comprises a plurality of LEDs in which the number of LEDs that are triggered increases as the distance between said reader device and said tag device decreases.

11. The system of claim 9 wherein said audible indicator comprises a beeper in which the frequency of beeps output by the beeper increases as the distance between said reader device and said tag device decreases.

12. The system of claim 1 wherein said timing circuit comprises a microcontroller which is programmed trigger said RF pulse generator at predetermined intervals and when said ultrasonic pulse is received by said ultrasonic receiver.

13. A method of detecting the presence of an object comprising:
    A. transmitting ultrasonic pulses at a first rate of occurrence from a first location;
    B. receiving at least one of said ultrasonic pulses at a second location;
    C. transmitting an RF pulse in response to said reception of said ultrasonic pulse at said second location;
    D. receiving said RF pulse at said first location; and
    E. detecting the presence of said object at said second location based on the reception of said RF pulse at said first location; and
    F. generating a timing pulse to trigger the transmission of the RF pulse in Step C at a second rate of occurrence when the reception of an ultrasonic pulse in Step B does not occur within a predetermined period of time from the reception of a previous ultrasonic pulse.

14. The method of claim 13 further comprising determining a distance of said object from said first location based on an elapsed time between said transmission of said ultrasonic pulse from said first location to the reception of said RF pulse at said first location.

15. The method of claim 14 further comprising activating an alarm when said distance between said object and said first location is less than a predetermined range.

16. The method of claim 15 wherein said activating step comprises at least one of illuminating a series of LEDs and activating a beeper.

17. A presence detection system comprising:
    a reader device attached to a first body, comprising:
        an ultrasonic transducer for generating and transmitting ultrasonic pulses at a first rate of occurrence;
        an RF receiver for receiving an RF signal; and
        a first microcontroller coupled to said ultrasonic transducer and said RF receiver for receiving signals from said RF receiver and for controlling the operation of ultrasonic transducer and said RF receiver; and
    at least two tag devices, each tag device comprising:

an ultrasonic receiver for receiving ultrasonic pulses from said ultrasonic transducer of said reader device; and an RF pulse generator for generating and transmitting an RF pulse;

wherein:
  A. said first microcontroller instructs said ultrasonic transducer to generate and transmit said ultrasonic pulses:
  B. said ultrasonic receiver of said tag devices receive at least one of said ultrasonic pulses;
  C. said ultrasonic receiver of each of said tag devices triggers its associated RF signal generator to transmit an RF pulse;
  D. said RF receiver of said reader device receives said RF pulse from each of said tag devices; and
  E. said first microcontroller detects the presence of a closest of said tag devices to said reader device, with range determination based on the elapsed time between transmission of any particular ultrasonic pulse and reception of the first RF response pulse associated with that ultrasonic pulse.

18. A presence detection system comprising:

a reader device attached to a first body, comprising:
  an ultrasonic transducer for generating and transmitting ultrasonic pulses at a first rate of occurrence;
  an RF receiver for receiving an RF signal; and
  a first microcontroller coupled to said ultrasonic transducer and said RF receiver for receiving signals from said RF receiver and for controlling the operation of ultrasonic transducer and said RF receiver; and a tag device attached to a second body, comprising:
  an ultrasonic receiver for receiving ultrasonic pulses from said ultrasonic transducer of said reader device; and
  an RF pulse generator for generating and transmitting an RF pulse;

wherein:
  A. said first microcontroller instructs said ultrasonic transducer to generate and transmit said ultrasonic pulses:
  B. said ultrasonic receiver of said tag device receives at least two of said ultrasonic pulses;
  C. said ultrasonic receiver triggers said RF signal generator to transmit a first RF pulse in response to the reception of a first of said ultrasonic pulses;
  D. said RF receiver of said reader device receives said first RF pulse;
  E. said ultrasonic receiver triggers said RF signal generator to transmit a second RF pulse in response to the reception of a second of said ultrasonic pulses;
  F. said RF receiver of said reader device receives said second RF pulse; and
  G. said first microcontroller detects the rate of change of the distance of said tag device from said reader device based on a difference between reception times of said first and second RF pulses with respect to the transmission times of the first and second ultrasonic pulses, respectively.

* * * * *